United States Patent
Wigen et al.

(10) Patent No.: US 9,933,290 B1
(45) Date of Patent: Apr. 3, 2018

(54) ADDITIVELY MANUFACTURED FLOW MEASUREMENT SENSOR

(71) Applicant: Rosemount Aerospace Inc., Burnsville, MN (US)

(72) Inventors: Scott Wigen, Eagan, MN (US); Walter S. Pekala, Ellington, CT (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 15/624,988

(22) Filed: Jun. 16, 2017

(51) Int. Cl.
| | |
|---|---|
| *G01F 1/66* | (2006.01) |
| *G01F 1/44* | (2006.01) |
| *G01F 1/76* | (2006.01) |
| *B33Y 10/00* | (2015.01) |
| *B33Y 80/00* | (2015.01) |
| *B29C 67/00* | (2017.01) |
| *B22F 3/105* | (2006.01) |

(52) U.S. Cl.
CPC .............. *G01F 1/44* (2013.01); *B29C 67/0051* (2013.01); *B33Y 10/00* (2014.12); *B33Y 80/00* (2014.12); *G01F 1/76* (2013.01); *B22F 3/1055* (2013.01)

(58) Field of Classification Search
CPC ...... G01F 1/66; G01F 1/74; G01F 1/42; G01F 1/44
See application file for complete search history.

(56) References Cited

U.S. PATENT DOCUMENTS

| | | | |
|---|---|---|---|
| 8,863,587 B2 * | 10/2014 | Cadalen | G01F 1/44 73/861.04 |
| 9,027,392 B2 | 5/2015 | Vander Hoek | |
| 9,194,731 B2 | 11/2015 | Chatzikonstantinou | |
| 9,453,461 B2 | 9/2016 | Patel et al. | |
| 9,513,148 B2 * | 12/2016 | Hogendoorn | G01F 1/74 |
| 9,581,475 B2 * | 2/2017 | Johnson | G01F 1/42 |
| 9,651,455 B2 * | 5/2017 | Bowling | G01M 15/09 |
| 2017/0052048 A1 * | 2/2017 | Eriksson | G01F 1/66 |

\* cited by examiner

*Primary Examiner* — Jewel V Dowtin
(74) *Attorney, Agent, or Firm* — Kinney & Lange, P.A.

(57) ABSTRACT

A flow measurement sensing device includes a first venturi having a first shield portion, an elongated portion connected to an outer surface of the first venturi, and a second venturi housed within the first venturi. The second venturi has a second shield portion and at least one air inlet. The flow measurement sensing device further includes a first integral passageway extending from the air inlet through the elongated portion. The first integral passageway has a first segment with a first cross-sectional shape and a segment with a second cross-sectional shape.

20 Claims, 4 Drawing Sheets

ADDITIVELY MANUFACTURED FLOW MEASUREMENT SENSOR

BACKGROUND

Mass flow measurement sensors are commonly used in aircraft environmental control systems (ECS). One type of sensor, a boost venturi sensor, includes concentric venturi structures, and may further include one or more electronic pressure sensors that provide fluid flow information to a control unit. Current venturi-type sensors are formed from various cast, forged, and machined components that undergo manufacturing processes such as dip brazing or welding to join the multiple components. The venturi sensor is then drilled to create fluid sense lines within the sensor body. The accuracy of conventionally-manufactured boost venturi sensors can be negatively impacted by the multiple braze joints and plugged cross-drill points. Further, the cross-section of conventional venturis is limited to what can be achieved by current tooling methods or access to cross-drilling and plugging. Thus, the need exists for boost venturi sensors having a more seamless design and optimized for placement in a variety of fluid streams.

SUMMARY

A flow measurement sensing device includes a first venturi having a first shield portion, an elongated portion connected to an outer surface of the first venturi, and a second venturi housed within the first venturi. The second venturi has a second shield portion and at least one air inlet. The flow measurement sensing device further includes a first integral passageway extending from the air inlet through the elongated portion. The first integral passageway has a first segment with a first cross-sectional shape and a segment with a second cross-sectional shape.

A method of forming a flow measurement sensing device includes forming a first venturi having a first shield portion, forming an elongated portion extending from the first venturi and having a first integral passageway extending therethrough, and forming a second venturi having a second shield portion within the first venturi. The method further includes forming at least one air inlet near the second shield portion of the second venturi. The first integral passageway extends from the at least one air inlet through the elongated portion and includes a first segment with a first cross-sectional shape and a second segments with a second cross-sectional shape.

DETAILED DESCRIPTION

An additively manufactured flow measurement sensor is disclosed herein. The fluid passageways are integrally formed with the sensor such that there are no cross-drill points needing to be plugged. The main venturi and/or the boost venturi can be formed with various cross-sections to optimize fluid flow through the sensor. Other features can also be added to allow for more accurate flow readings.

Figure 1:
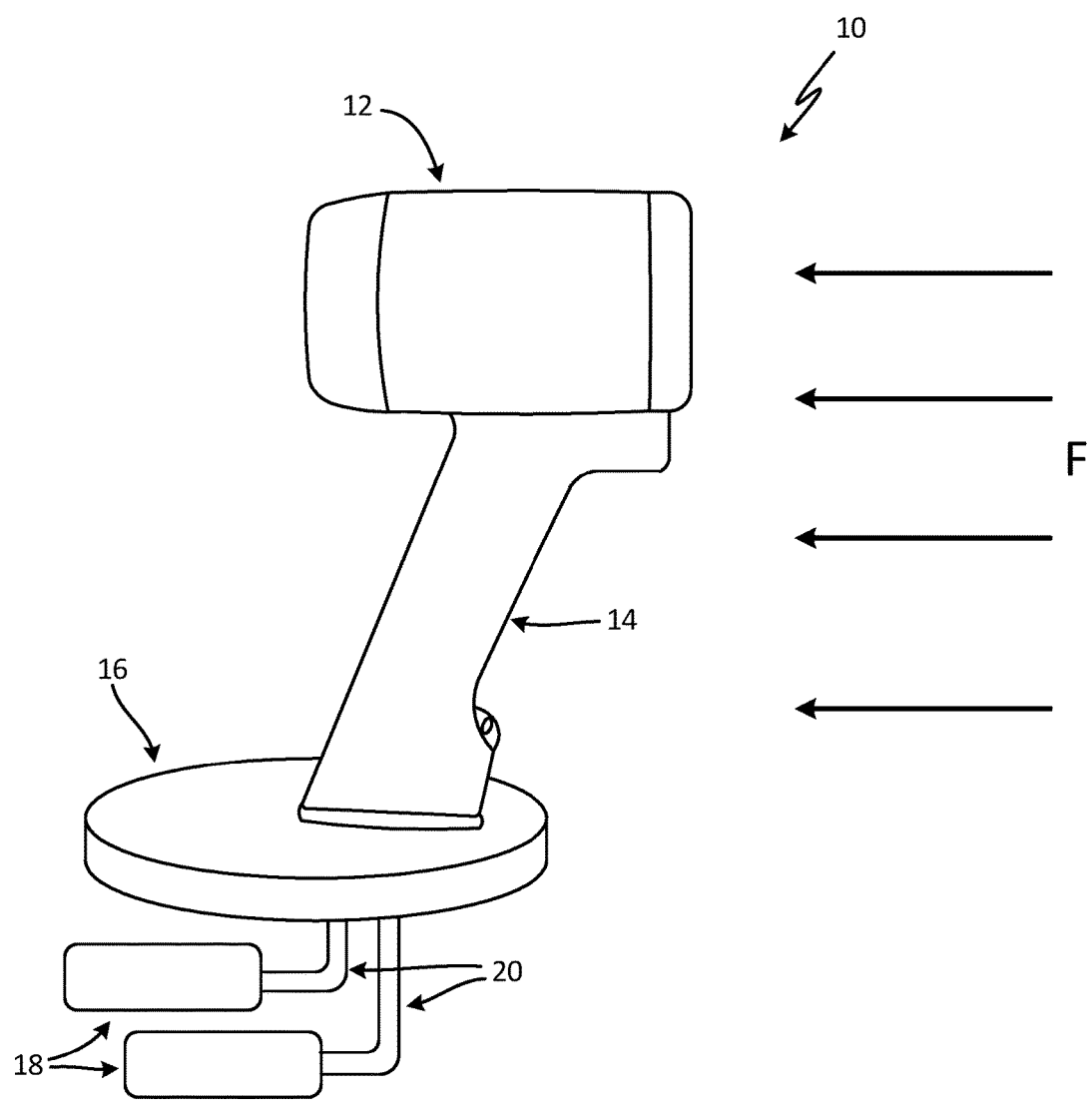
FIG. 1 is a side view of a flow measurement sensing device.

FIG. 1 is a side view of flow measurement sensing device 10. Device 10 includes venturi portion 12, elongated portion 14, base portion 16, and pressure sensors 18. Sensors 18 can be mounted to base portion 16, or located within the environmental control system (ECS). Sensors 18 receive fluid flow through external flow lines 20. In another embodiment, device 10 can include a plate (not shown) attached to the bottom of base portion 16 to which sensors 18 can be mounted, and which can include mounts to attach device 10 to a surface within the ECS. Device 10 can be mounted in an air duct within the ECS in an exemplary embodiment, but can also be placed in a free stream of air (outside of an enclosed structure) to provide flow measurements. Device 10 samples portions of airflow F (indicated by the arrows).

Figure 2:
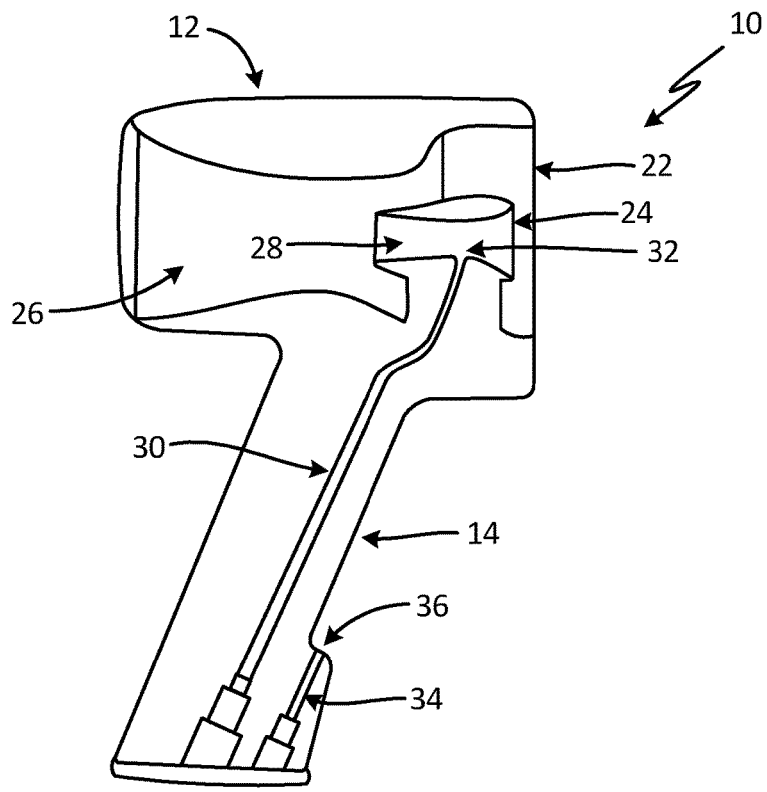
FIG. 2 is a cross-section of the flow measurement sensing device.

FIG. 2 is a cross-section of device 10 above base portion 16. As can be seen in FIG. 2, venturi portion 12 includes main venturi 22, and boost venturi 24 disposed concentrically within main venturi 22. Main venturi includes an inner surface 26, and boost venturi 24 includes an inner surface 28. Inner surfaces 26, 28 can be smooth, roughened, or can include a combination of smooth and rough portions, based on the application.

A first passageway 30 extends from venturi air inlet 32 through elongated portion 14. A second passageway 34 extends from inlet 36 through elongated portion 14. In operation, a portion of the airflow through boost venturi 24 enters inlet 32 and flows through passageway 30. Similarly, a portion of airflow around elongated portion 14 enters inlet 36 and flows through passageway 34. As can be seen in FIGS. 1 and 2, flow lines 20 (FIG. 1) are aligned with passageways 30 and 34, such that airflow through the passageways reaches pressure sensors 18. Pressure sensors 18 can be, for example, differential pressure sensors measuring changes in static and total pressure.

Figure 3A:
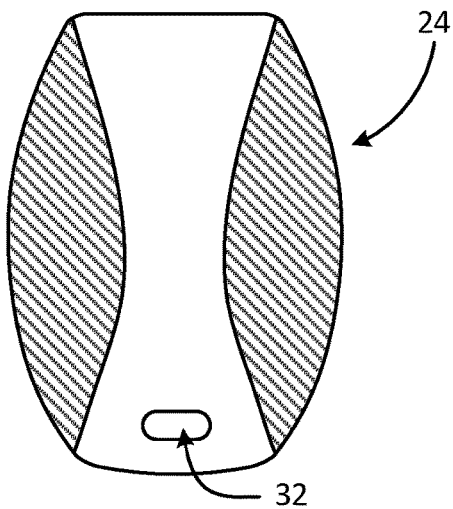
FIGS. 3A and 3B are cross-sections showing a boost venturi air inlet according to alternative embodiments of the present invention.
Figure 3B:
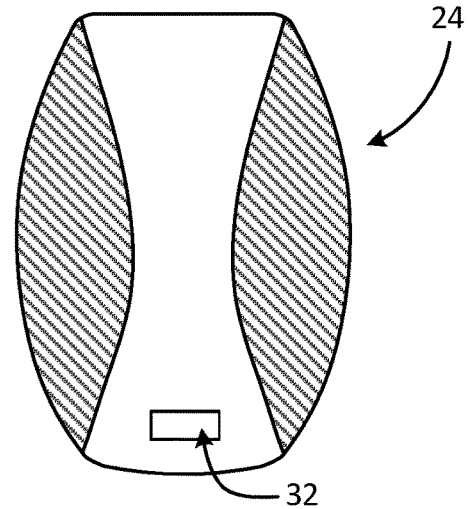
Figure 4:
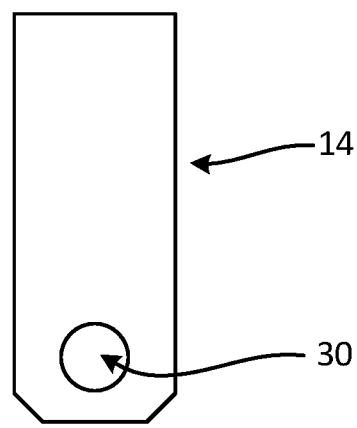
FIG. 4 is a cross-section of an elongated portion of the flow measurement sensing device showing an airflow passageway.

Passageway 30 is integrally formed with venturi portion 12 and elongated portion 14. Passageway 30 can be formed to include a tapered portion beginning at and in the region adjacent inlet 32. FIGS. 3A and 3B are cross-sections of boost venturi 24 at inlet 32. As is shown in the figures, the tapered portion can be elliptical (FIG. 3A) or rectangular (FIG. 3B) in some embodiments. The remainder of passageway 30 can have a generally cylindrical cross-section, as is shown in the cross section taken at a mid-point of elongated portion 14, illustrated by FIG. 4. The initially tapered cross-section of passageway 30 allows for a smoother transition of the airflow entering passageway 30 at inlet 32, which increases the accuracy of device 10. In other embodiments, however, passageway 30 can have a uniform cross-section (cylindrical, elliptical, rectangular, etc.) based on flow sensing requirements.

Figure 5A:
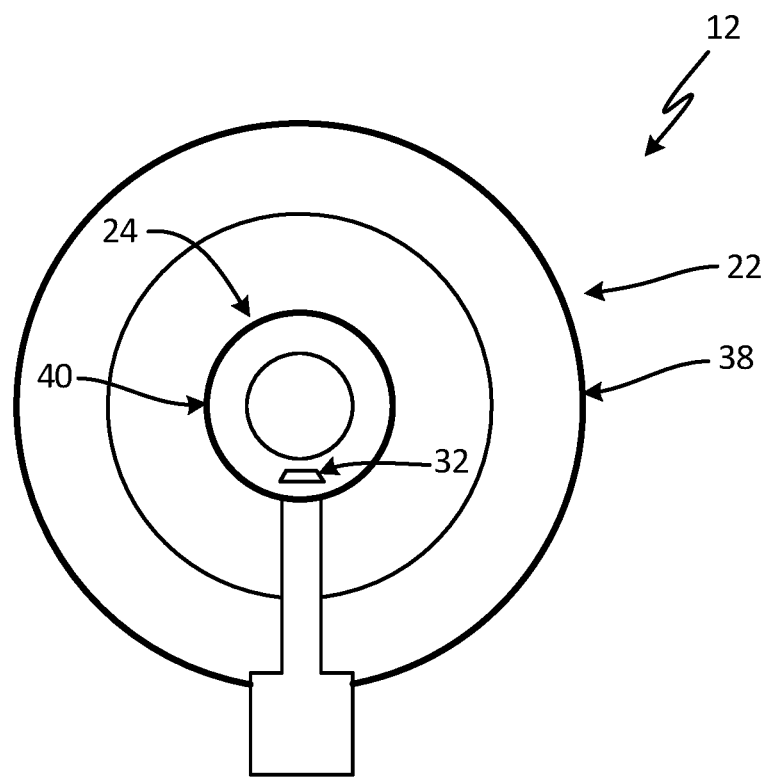
FIGS. 5A and 5B are front views of a venturi portion of the flow measurement sensing device according to alternative embodiments of the present invention.
Figure 5B:
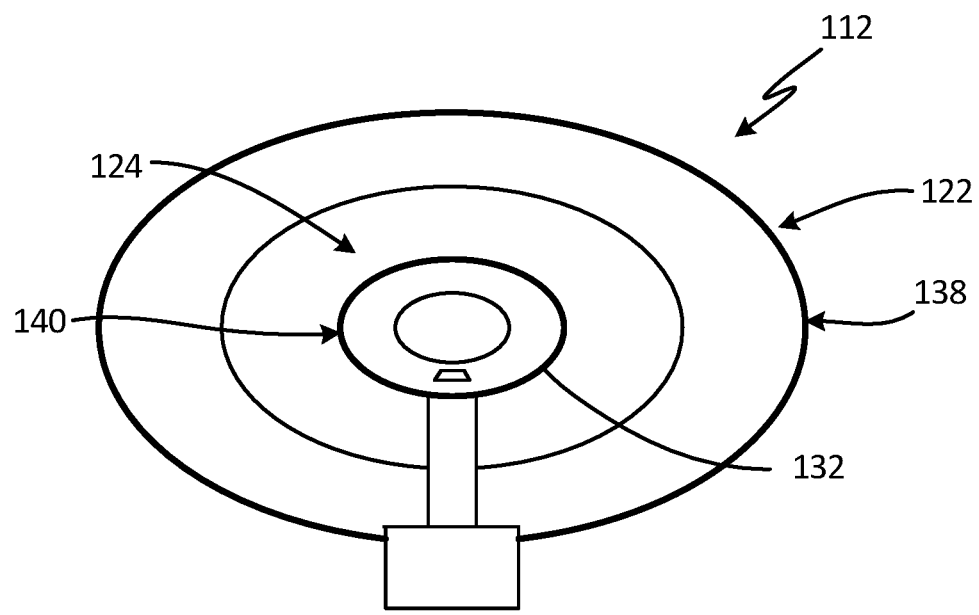

FIG. 5A is a front view of venturi portion 12, and FIG. 5B is a front view of alternative venturi portion 112 at its upstream side (based on the direction of airflow F in FIG. 1). Main venturi 22 includes shield 38, while boost venturi 24 includes a similar shield 40. In the embodiment shown, shields 38 and 40 have generally circular cross-sections, however, other embodiments of device 10 can include shields having different cross-sections. For example, FIG.

5B shows an alternative embodiment in which main venturi 122 and boost venturi 124 have generally oblong shields 138 and 140, respectively. In other embodiments, shield 38/138 has a circular cross-section, while shield 40/140 has an oblong cross-section, or vice versa. Other suitable shield shapes and combinations of shapes are contemplated herein. Shields 38/138 and 40/140 can also be angled to optimize airflow through venturi portion 12/112.

Figure 6:
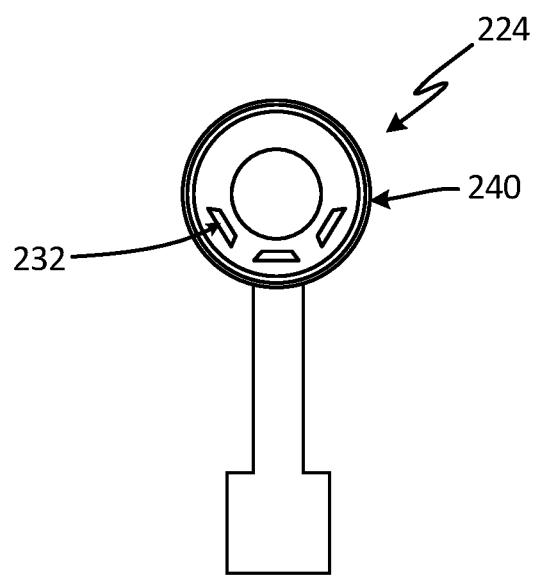
FIG. 6 is a front view of the boost venturi according to an alternative embodiment of the present invention.

FIG. 6 is a front view of boost venturi 224 according to another embodiment of the present invention. In the embodiment shown, boost venturi 224 includes multiple inlets 232. Providing multiple inlets 232 creates more airflow sampling points, which can increase the accuracy of the airflow measurements. Although boost venturi 224 is shown with three inlets 232, two inlets, or more than three inlets having uniform or varied cross-sections can be included.

Device 10 can be formed from a number of materials, based on the application and the sensing environment. For low temperature applications, device 10 can be formed from a lightweight polymeric or nylon material. For medium temperature applications, aluminum or titanium can be used. High temperature applications may require a superalloy, such as an Inconel alloy. Device 10 can further be formed using a variety of additive manufacturing processes, based on the application and desired material, or the specific design to be achieved. These processes can include selective laser sintering (SLS), direct metal laser sintering (DMLS), selective laser melting (SLM), fused deposition modeling (FDM), electron beam melting (EBM), and more. To carry out the additive manufacturing process, a digital model of the desired embodiment of device 10 is inputted into an additive manufacturing apparatus. Such an embodiment can include any of the features discussed above, including passageways and/or venturi shields having varied cross-sectional profiles, venturis with varied inner surface roughness, and single or multiple air inlets.

Additively manufactured flow sensing device 10 has many benefits. The venturi shields can be shaped in ways that traditional lathe techniques cannot generally be used to produce. The cross-section of the boost venturi air inlet(s), as well as the initial portion of the airflow passageway can more easily be tapered to better transition airflow through the passageway. The need for cross-drilling and the resultant plugs is also eliminated. Each of these features contributes to increased accuracy of flow measurements over sensors of the prior art. Finally, device 10 can be customized for use in a variety of flow sensing applications, including those relevant to the transportation (aerospace, automotive, etc.) industries, or generally for any application requiring fluid flow sensing.

Discussion of Possible Embodiments

The following are non-exclusive descriptions of possible embodiments of the present invention.

A flow measurement sensing device includes a first venturi having a first shield portion, an elongated portion connected to an outer surface of the first venturi, and a second venturi housed within the first venturi. The second venturi has a second shield portion and at least one air inlet. The flow measurement sensing device further includes a first integral passageway extending from the air inlet through the elongated portion. The first integral passageway has a first segment with a first cross-sectional shape and a segment with a second cross-sectional shape.

The device of the preceding paragraph can optionally include, additionally and/or alternatively, any one or more of the following features, configurations and/or additional components:

The at least one air inlet of the second venturi includes a plurality of air inlets within the second venturi, and each of the air inlets is in communication with the first integral passageway.

A second integral passageway is within the elongated portion.

A pressure sensor is in communication with the first integral passageway.

The first shield portion has a circular cross-sectional shape.

The first shield portion has an oblong cross-sectional shape.

The second shield portion has a circular cross-sectional shape.

The second shield portion has an oblong cross-sectional shape.

The first cross-sectional shape of the first segment is an ellipse or a rectangle.

The second cross-sectional shape of the second segments is a circle.

The first and second venturis and the elongated portion are formed from a material selected from the group consisting of polymers, metals, metal alloys, and combinations thereof.

A method of forming a flow measurement sensing device includes forming a first venturi having a first shield portion, forming an elongated portion extending from the first venturi and having a first integral passageway extending therethrough, and forming a second venturi having a second shield portion within the first venturi. The method further includes forming at least one air inlet near the second shield portion of the second venturi. The first integral passageway extends from the at least one air inlet through the elongated portion and includes a first segment with a first cross-sectional shape and a second segments with a second cross-sectional shape.

The method of the preceding paragraph can optionally include, additionally and/or alternatively, any one or more of the following features, configurations and/or additional components:

Forming a plurality of air inlets within the second venturi, the air inlets being in communication with the first integral passageway.

Forming the elongated portion to include the first and second integral passageways extending therethrough.

Forming the first venturi includes forming a first shield portion having a circular or oblong cross-sectional shape.

Forming the second venturi includes forming a second shield portion having a circular or oblong cross-sectional shape.

The first cross-sectional shape of the first segment is an ellipse or a rectangle.

The second cross-sectional shape of the second segment is a circle.

Forming the sensing device by additive manufacturing.

Forming the sensing device from a material selected from the group consisting of polymers, metals, metal alloys, and combinations thereof.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A flow measurement sensing device comprising:
a first venturi comprising a first shield portion;
an elongated portion connected to an outer surface of the first venturi;
a second venturi housed within the first venturi, the second venturi comprising:
a second shield portion; and
at least one air inlet; and
a first integral passageway extending from the at least one air inlet through the elongated portion, the first integral passageway comprising a first segment having a first cross-sectional shape and a second segment having a second cross-sectional shape.

2. The device of claim 1, wherein the at least one air inlet of the second venturi comprises a plurality of air inlets within the second venturi, wherein each of the plurality of air inlets is in communication with the first integral passageway.

3. The device of claim 1 further comprising a second integral passageway within the elongated portion.

4. The device of claim 1 further comprising a pressure sensor in communication with the first integral passageway.

5. The device of claim 1, wherein the first shield portion has a circular cross-sectional shape.

6. The device of claim 1, wherein the first shield portion has an oblong cross-sectional shape.

7. The device of claim 1, wherein the second shield portion has a circular cross-sectional shape.

8. The device of claim 1, wherein the second shield has an oblong cross-sectional shape.

9. The sensor of claim 1, wherein the first cross-sectional shape of the first segment is an ellipse or a rectangle.

10. The sensor of claim 1, wherein the second cross-sectional shape of the second segment is a circle.

11. The sensor of claim 1, wherein the first and second venturis and the elongated portion are formed from a material selected from the group consisting of polymers, metals, metal alloys, and combinations thereof.

12. A method of forming a flow measurement sensing device comprising:
forming a first venturi having a first shield portion;
forming an elongated portion, the elongated portion extending from the first venturi and having a first integral passageway extending therethrough;
forming a second venturi within the first venturi, the second venturi having a second shield portion; and
forming at least one air inlet near the second shield portion of the second venturi;
wherein the first integral passageway extends from the at least one air inlet through the elongated portion, the first integral passageway comprising a first segment having a first cross-sectional shape and a second segment having a second cross-sectional shape.

13. The method of claim 12 further comprising forming a plurality of air inlets within the second venturi, wherein each of the plurality of air inlets is in communication with the first integral passageway.

14. The method of claim 12, wherein forming the elongated portion is performed such that the elongated portion includes the first integral passageway and a second integral passageway extending therethrough.

15. The method of claim 12, wherein forming the first venturi comprises forming a first shield portion having a circular or oblong cross-sectional shape.

16. The method of claim 12, wherein forming the second venturi comprises forming a second shield portion having a circular or oblong cross-sectional shape.

17. The method of claim 12, wherein the first cross-sectional shape of the first segment is an ellipse or a rectangle.

18. The method of claim 12, wherein the second cross-sectional shape of the second segment is a circle.

19. The method of claim 12 further comprising forming the sensing device by additive manufacturing.

20. The method of claim 12 further comprising forming the sensing device from a material selected from the group consisting of polymers, metals, metal alloys, and combinations thereof.

* * * * *